(12) United States Patent
Hwang et al.

(10) Patent No.: US 9,635,654 B2
(45) Date of Patent: Apr. 25, 2017

(54) METHOD AND DEVICE FOR TRANSMITTING UPLINK CONTROL INFORMATION

(71) Applicant: LG ELECTRONICS INC., Seoul (KR)

(72) Inventors: Daesung Hwang, Anyang-si (KR); Yunjung Yi, Anyang-si (KR); Bonghoe Kim, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/420,298

(22) PCT Filed: Jun. 27, 2013

(86) PCT No.: PCT/KR2013/005686
§ 371 (c)(1),
(2) Date: Feb. 6, 2015

(87) PCT Pub. No.: WO2014/046374
PCT Pub. Date: Mar. 27, 2014

(65) Prior Publication Data
US 2015/0208402 A1 Jul. 23, 2015

Related U.S. Application Data

(60) Provisional application No. 61/702,747, filed on Sep. 19, 2012.

(51) Int. Cl.
H04W 72/04 (2009.01)
H04L 1/18 (2006.01)
(Continued)

(52) U.S. Cl.
CPC ....... H04W 72/0413 (2013.01); H04L 1/1861 (2013.01); H04B 7/2656 (2013.01); H04L 5/0053 (2013.01)

(58) Field of Classification Search
CPC . H04W 52/34; H04W 72/02; H04W 72/0413; H04W 72/0473; H04W 72/10;
(Continued)

(56) References Cited

U.S. PATENT DOCUMENTS 5,832,381 A * 11/1998 Kauppi ................. H04W 60/04
455/432.1
8,369,209 B2 * 2/2013 Zhang .................. H04W 74/08
370/216
(Continued)

FOREIGN PATENT DOCUMENTS

JP WO 2011099615 A1 * 8/2011 ............. H04L 5/001
JP 2012-516616 A 7/2012
KR 10-2012-0100759 A 9/2012

OTHER PUBLICATIONS

Nishikawa (WO 2011/099615 A1), Espacenet, English Machine Translation.*
(Continued)

*Primary Examiner* — Michael Thier
*Assistant Examiner* — Eric Nowlin
(74) *Attorney, Agent, or Firm* — Birch, Stewart, Kolasch & Birch, LLP

(57) ABSTRACT

One embodiment of the present specification discloses a method for transmitting uplink control information (UCI). The method may be performed by a terminal and comprise receiving control information for setting such that an uplink control channel and an uplink shared channel are not simultaneously transmitted on one uplink subframe; selecting one of the channels, if first uplink control information (UCI) for a first cell and second uplink control information (UCI) for
(Continued)

a second cell are requested to be simultaneously transmitted on the one uplink subframe through the uplink control channel in case of the first uplink control information (UCI) and through the uplink shared channel in case of the second uplink control information (UCI); and transmitting at least one from among the first uplink control information (UCI) and the second uplink control information (UCI) on the uplink subframe through the selected channel.

13 Claims, 14 Drawing Sheets

(51) Int. Cl.
  *H04B 7/26* (2006.01)
  *H04L 5/00* (2006.01)
(58) Field of Classification Search
  CPC ............ H04W 72/1284; H04L 1/0026; H04L 1/1671; H04L 1/1861; H04L 5/001; H04L 5/0053; H04L 5/0055; H04L 5/0057
  See application file for complete search history.

(56) References Cited

U.S. PATENT DOCUMENTS

| | | | | |
|---|---|---|---|---|
| 9,197,367 | B2* | 11/2015 | Yamada | H04L 1/0073 |
| 9,277,543 | B2* | 3/2016 | Aiba | H04L 1/0026 |
| 9,294,230 | B2* | 3/2016 | Han | H04L 1/1657 |
| 9,301,286 | B2* | 3/2016 | Chung | H04L 5/0055 |
| 9,320,027 | B2* | 4/2016 | Chung | H04W 72/0413 |
| 9,344,999 | B2* | 5/2016 | Lee | H04W 72/042 |
| 9,386,565 | B2* | 7/2016 | Yang | H04L 1/1861 |
| 9,414,367 | B2* | 8/2016 | Hwang | H04W 72/0413 |
| 9,426,792 | B2* | 8/2016 | Jang | H04J 13/22 |
| 9,426,797 | B2* | 8/2016 | Yang | H04L 1/1861 |
| 9,450,714 | B2* | 9/2016 | Hwang | H04L 1/0026 |
| 9,491,753 | B2* | 11/2016 | Aiba | H04L 5/001 |
| 9,516,630 | B2* | 12/2016 | Yang | H04L 1/1671 |
| 2006/0068823 | A1* | 3/2006 | Kwon | H04W 28/06 455/517 |
| 2008/0159323 | A1 | 7/2008 | Rinne et al. | |
| 2008/0280638 | A1 | 11/2008 | Malladi et al. | |
| 2010/0098012 | A1* | 4/2010 | Bala | H04L 5/001 370/329 |
| 2010/0195566 | A1* | 8/2010 | Krishnamurthy | H04L 5/0007 370/328 |
| 2010/0195575 | A1* | 8/2010 | Papasakellariou | H04W 36/385 370/328 |
| 2011/0103498 | A1* | 5/2011 | Chen | H04L 1/06 375/260 |
| 2011/0141928 | A1* | 6/2011 | Shin | H04L 1/0028 370/252 |
| 2011/0274043 | A1* | 11/2011 | Nam | H04L 5/001 370/328 |
| 2012/0113827 | A1* | 5/2012 | Yamada | H04L 1/0031 370/252 |
| 2012/0163185 | A1* | 6/2012 | Zhang | H04W 72/085 370/241 |
| 2012/0213187 | A1* | 8/2012 | Yang | H04L 1/0027 370/329 |
| 2012/0236771 | A1* | 9/2012 | Luo | H04L 1/1607 370/311 |
| 2013/0070689 | A1* | 3/2013 | Liu | H04W 72/0413 370/329 |
| 2013/0121302 | A1* | 5/2013 | Yang | H04L 1/1692 370/329 |
| 2013/0155898 | A1* | 6/2013 | Yin | H04L 1/0026 370/254 |
| 2013/0301448 | A1* | 11/2013 | Sayana | H04W 24/10 370/252 |
| 2013/0301564 | A1* | 11/2013 | Chen | H04W 72/0413 370/329 |
| 2014/0003452 | A1* | 1/2014 | Han | H04L 1/1657 370/474 |
| 2014/0044083 | A1* | 2/2014 | Kim | H04L 5/001 370/329 |
| 2014/0071864 | A1 | 3/2014 | Seo et al. | |
| 2014/0177572 | A1* | 6/2014 | Papasakellariou | H04W 36/385 370/329 |
| 2014/0362797 | A1* | 12/2014 | Aiba | H04L 1/0026 370/329 |
| 2015/0139101 | A1* | 5/2015 | Guo | H04L 5/0035 370/329 |
| 2016/0057750 | A1* | 2/2016 | Jang | H04J 13/22 370/329 |
| 2016/0135149 | A1* | 5/2016 | Aiba | H04L 5/001 370/329 |
| 2016/0156447 | A1* | 6/2016 | Kim | H04L 5/001 370/329 |
| 2016/0165592 | A1* | 6/2016 | Han | H04L 1/1657 370/280 |
| 2016/0212786 | A1* | 7/2016 | Hwang | H04B 7/2656 |
| 2016/0234000 | A1* | 8/2016 | Lee | H04W 72/042 |
| 2016/0301515 | A1* | 10/2016 | Ouchi | H04L 5/0057 |
| 2016/0338034 | A1* | 11/2016 | Aiba | H04L 1/0026 |

OTHER PUBLICATIONS

3GPP, TS 36.211 Physical Channels and Modulation (Release 10), Jun. 2012, 3GPP, Version 10.5.0.*

* cited by examiner

METHOD AND DEVICE FOR TRANSMITTING UPLINK CONTROL INFORMATION

CROSS REFERENCE TO RELATED APPLICATIONS

This application is the National Phase of PCT International Application No. PCT/KR2013/005686, filed on Jun. 27, 2013, which claims priority under 35 U.S.C. 119(e) to U.S. Provisional Application No. 61/702,747, filed on Sep. 19, 2012, all of which are hereby expressly incorporated by reference into the present application.

BACKGROUND OF THE INVENTION

Field of the Invention

The present invention relates to wireless communication and, more particularly, to a method and apparatus for transmitting uplink control information in a wireless communication system.

Related Art

3GPP (3rd Generation Partnership Project) LTE (Long Term Evolution) that is an advancement of UMTS (Universal mobile Telecommunication system) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical the uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels are used in transmission of various uplink control information such as a hybrid automatic repeat request (HARQ) ACK/NACK, channel state information (CSI), and a scheduling request (an SR).

Radio resources for the uplink channels are more limited than radio resources for the downlink channels, a transmission error of the uplink control information may degrade service quality, and as a result, the design of the uplink channels needs to consider the transmission error.

SUMMARY OF THE INVENTION

An object of one disclosure of this specification is to provide a method and apparatus for transmitting uplink control information.

In order to achieve the aforementioned object, in accordance with one disclosure of this specification, there is provided a method of transmitting Uplink Control Information (UCI) in a wireless communication system. The method may be performed by a user equipment and comprise steps of: receiving control information that configures an uplink control channel and an uplink shared channel to be not simultaneously transmitted on a single uplink subframe; selecting any one of the uplink control channel and the uplink shared channel if first UCI for a first cell and second UCI for a second cell are required to be simultaneously transmitted through the uplink control channel and the uplink shared channel, respectively, on a single uplink subframe; and transmitting one or more of the pieces of first and second UCI on the uplink subframe through the selected channel.

In the selection, any one channel is selected based on a cell, a type of UCI, and a container. Here, a priority is determined based on any one of the cell, type of UCI, and container.

The method may comprise: receiving scheduling information from each of the first cell and the second cell on a downlink control channel; and receiving downlink data from each of the first cell and the second cell based on the received scheduling information. Here, each of the pieces of first and second UCI comprises an HARQ-ACK/NACK for each of the downlink data.

The step of transmitting one or more of the pieces of first and second UCI comprises piggybacking an HARQ-ACK/NACK to be transmitted through another channel other than the selected channel to the selected channel and transmitting the HARQ-ACK/NACK if each of the pieces of first and second UCI comprises the HARQ-ACK/NACK.

A process for reducing a number of bits of the UCI to be transmitted through the selected channel may be further performed.

UCI to be transmitted through another channel other than the selected channel may be dropped from the uplink subframe.

An ID of the first cell may be used for the transmission of the uplink control channel if the first UCI is transmitted to the first cell through the uplink control channel, and an ID of the secondary cell may be used for the transmission of the uplink shared channel if the second UCI is transmitted to the secondary cell through the uplink shared channel.

The ID of the first cell and the ID of the secondary cell may be obtained through the first cell.

Meanwhile, in order to achieve the aforementioned object, in accordance with another disclosure of this specification, there is provided a user equipment for transmitting Uplink Control Information (UCI) in a wireless communication system. The user equipment may comprise: an RF unit which receives control information that configures an uplink control channel and an uplink shared channel to be not simultaneously transmitted on a single uplink subframe; and a processor which selects any one of the uplink control channel and the uplink shared channel if first UCI for a first cell and second UCI for a second cell are required to be simultaneously transmitted through the uplink control channel and the uplink shared channel, respectively, on a single uplink subframe. Here, the RF unit transmits one or more of the pieces of first and second UCI on the uplink subframe through the channel selected by the processor.

When a PUCCH collides against a PUSCH in the state in which the UCI of each cell has been transmitted to the corresponding cell, the collision can be solved through an exemplary procedure of UE proposed in this specification.

DESCRIPTION OF EXEMPLARY EMBODIMENTS

A wireless device may be fixed or have mobility, and may be called as other terms such as user equipment (UE), a mobile station (MS), a user terminal (UT), a subscriber station (SS), and a mobile terminal (MT). A base station generally represents a fixed station that communicates with the wireless device, and may be called other terms such as an evolved-NodeB (eNB), a base transceiver system (BTS), an access point, and the like.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by high layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

Figure 1:
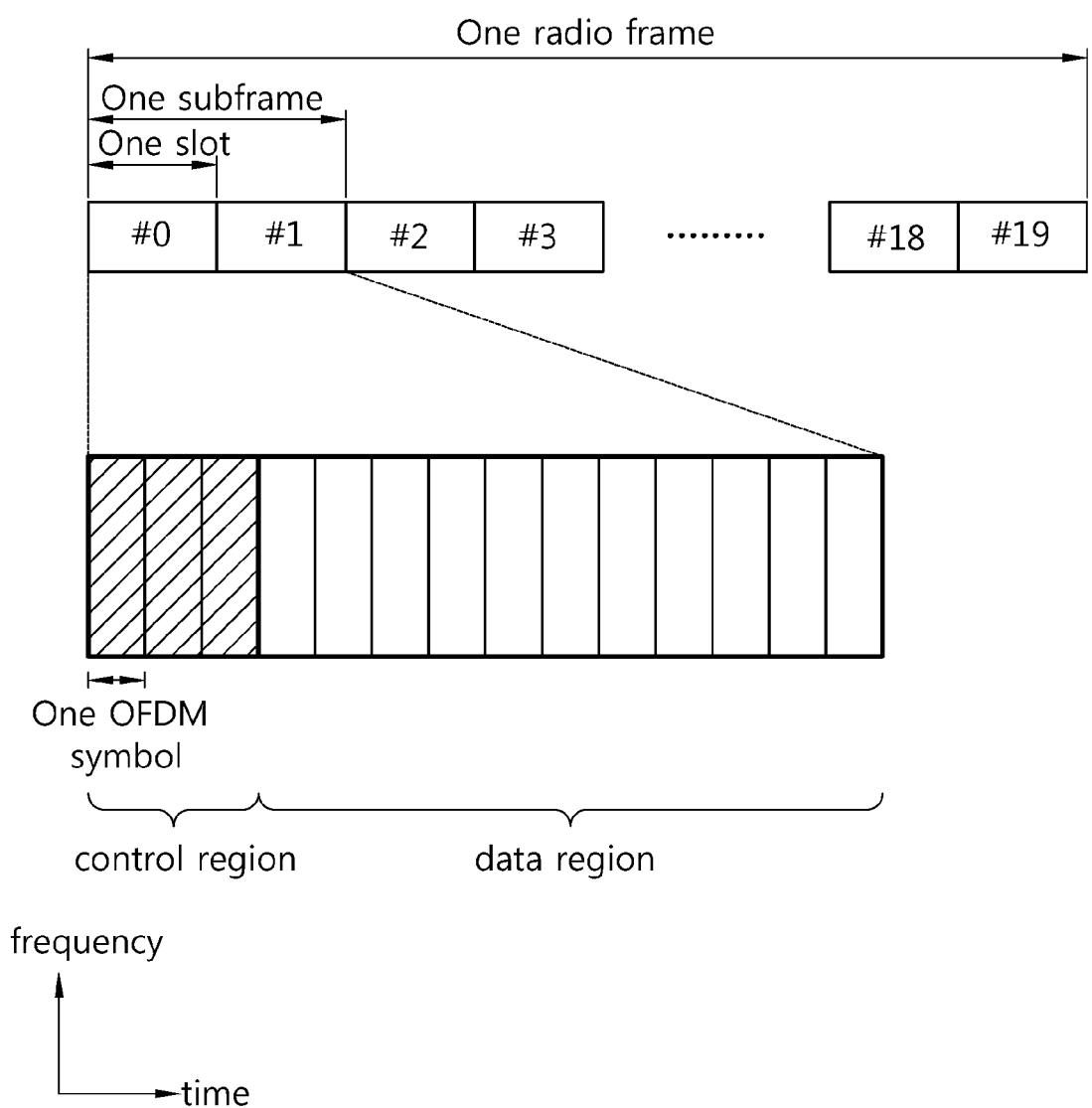
FIG. 1 illustrates the architecture of a DL radio frame in 3GPP LTE.

FIG. 1 illustrates the architecture of a downlink radio frame in 3GPP LTE.

For this, 3GPP TS 36.211 V10.4.0 (2011-December) "Evolved Universal Terrestrial Radio Access (E-UTRA); Physical Channels and modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical the uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for an UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 2:
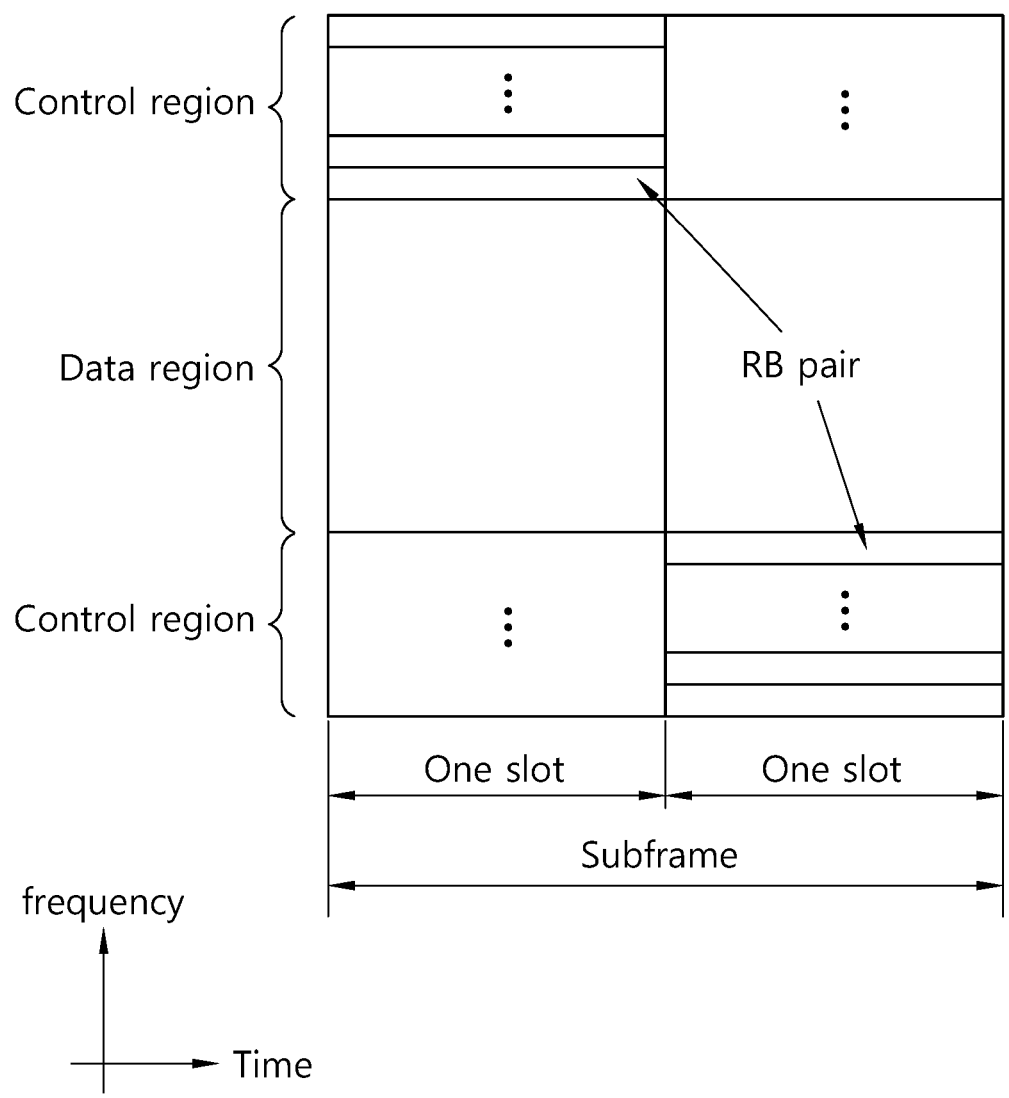
FIG. 2 illustrates the architecture of an UL subframe in 3GPP LTE.

FIG. 2 illustrates the architecture of an uplink sub-frame in 3GPP LTE.

Referring to FIG. 2, the uplink sub-frame may be separated into a control region and a data region in the frequency domain. The control region is assigned a PUCCH (physical uplink control channel) for transmission of uplink control information. The data region is assigned a PUSCH (physical the uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

A carrier aggregation system is now described.

Figure 3:
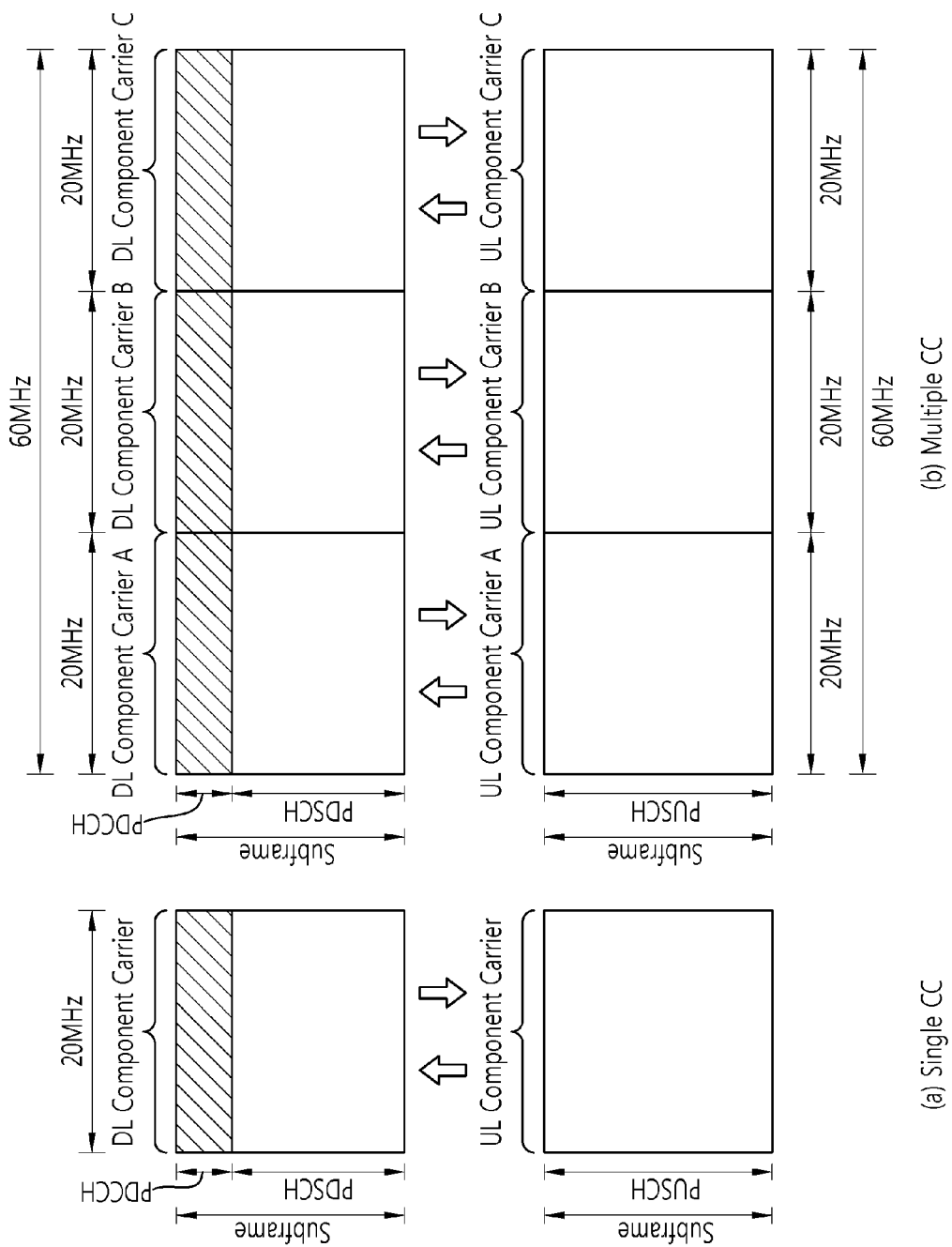
FIG. 3 is an example of a comparison between an existing single carrier system and a carrier aggregation system.

FIG. 3 illustrates an example of a comparison between a single carrier system and a carrier aggregation system.

Referring to FIG. 3, there may be various carrier bandwidths, and one carrier is assigned to the UE. On the contrary, in the carrier aggregation (CA) system, a plurality of component carriers (DL CC A to C, UL CC A to C) may be assigned to the UE. Component carrier (CC) means the carrier used in then carrier aggregation system and may be briefly referred as carrier. For example, three 20 MHz component carriers may be assigned so as to allocate a 60 MHz bandwidth to the UE.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the UE should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the UE does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the UE conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the UE cannot offer carrier aggregation. In case carrier aggregation is configured, the term "serving cell" denotes a cell configured to the UE and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the UE initially achieves connection or RRC connection with the base station. The PCC is a special CC that is in charge of connection or RRC connection for signaling regarding multiple CCs and manages terminal context information (UE context) that is connection information related with the UE. Further, the PCC achieves connection with the UE, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than PCC, which is assigned to the UE and is an extended carrier for the UE to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and an UL PCC. Seventh, a different component carrier (CC) may be set as a primary cell in each terminal Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, on the assumption that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than uplink CC linked to the downlink CC where the PDCCH including an UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 4:
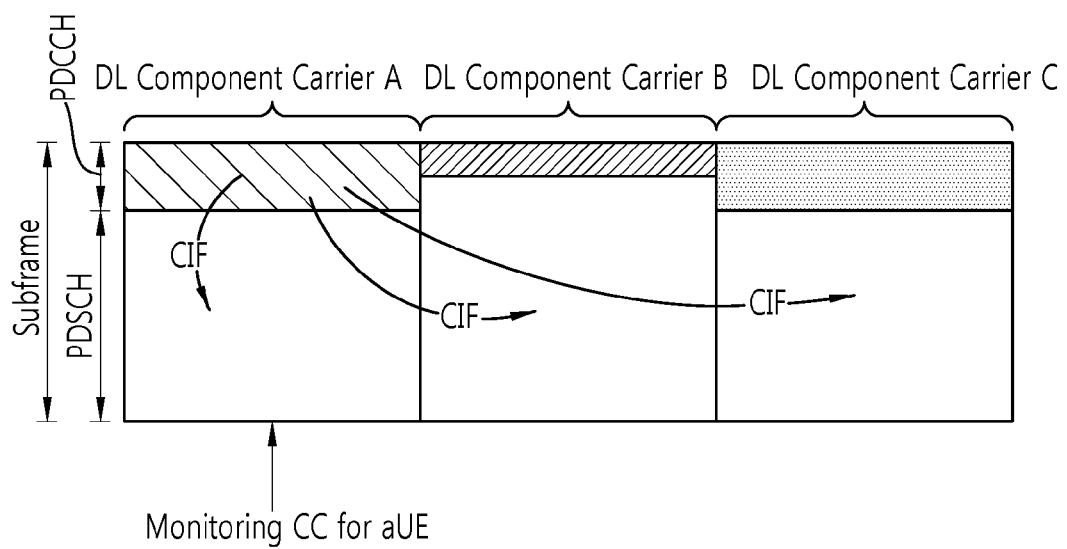
FIG. 4 illustrates cross carrier scheduling in a carrier aggregation system.

FIG. 4 illustrates an example of cross-carrier scheduling in a carrier aggregation system.

Referring to FIG. 4, the base station may configure a PDCCH monitoring DL CC (monitoring CC) set. The PDCCH monitoring DL CC set consists of some of all the aggregated DL CCs. If cross-carrier scheduling is configured, the UE conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 4, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

Figure 5:
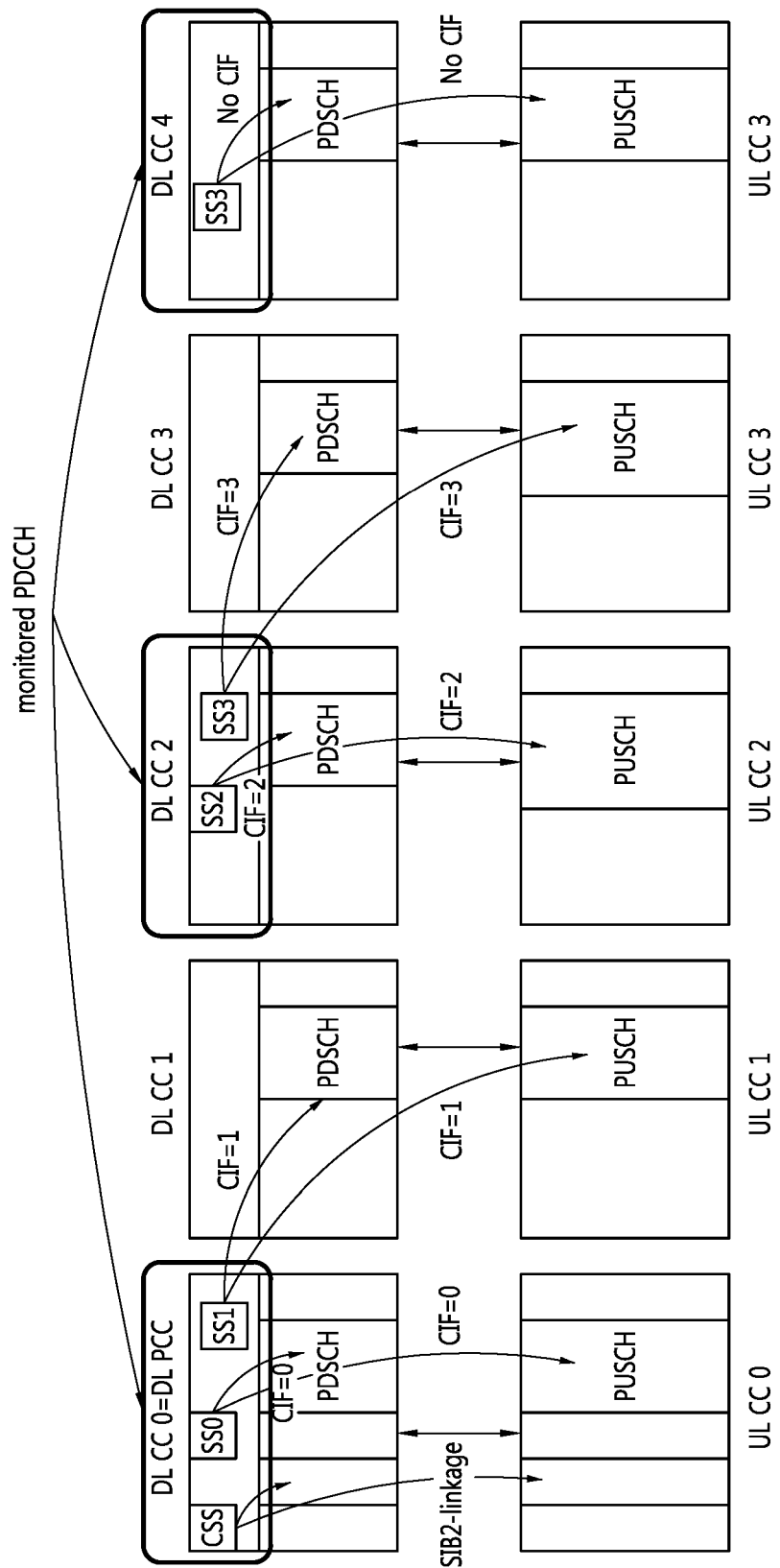
FIG. 5 illustrates a scheduling example when cross carrier scheduling is configured in a carrier aggregation system.

FIG. 5 illustrates an example of scheduling when cross-carrier scheduling is configured in a carrier aggregation system.

Referring to FIG. 5, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Figure 6:
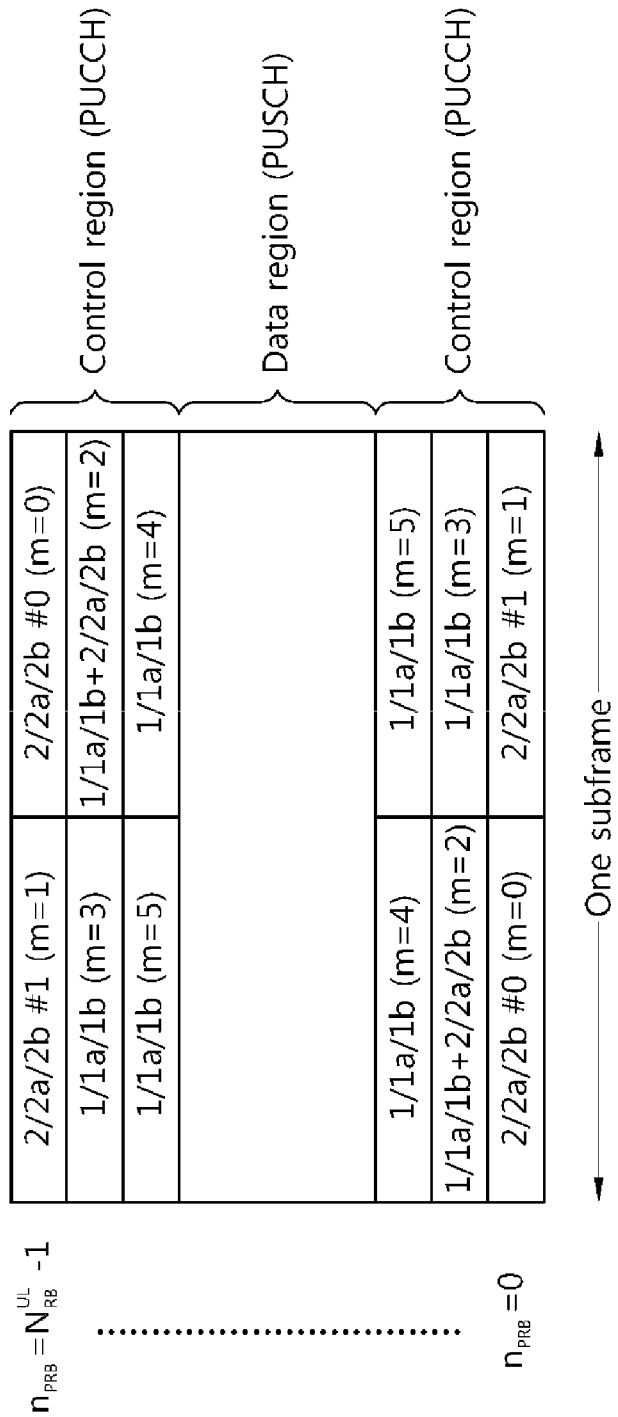
FIG. 6 illustrates PUCCHs and a PUSCH on an uplink subframe.

FIG. 6 illustrates PUCCHs and a PUSCH on an uplink subframe.

PUCCH formats will be described with reference to FIG. 6.

Uplink control information (UCI) may be transmitted to the PUCCH. In this case, the PUCCH transmits various types of control information according to a format. The UCI includes a HARQ ACK/NACK, a scheduling request (an SR), and channel state information (CSI) representing a downlink channel status.

PUCCH format 1 transmits a scheduling request (an SR). In this case, an on-off keying (OOK) scheme may be applied. PUCCH format 1a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 1 illustrates the PUCCH formats.

TABLE 1

| Format | Description |
|---|---|
| Format 1 | Scheduling request (an SR) |
| Format 1a | ACK/NACK of 1 bit HARQ, Scheduling request (an SR) may exist or not |
| Format 1b | ACK/NACK of 2 bit HARQ, Scheduling request (an SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which an SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than CQI, the RI is fed-back less than number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel state information. For example, the channel state information (CSI) multiplexed in the data may include the CQI, the PMI, the RI, and the like. Alternatively, the uplink data may be constituted by only the uplink state information. Periodic or aperiodic channel state information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

The periodic transmission of CSI is described below.

Figure 7:
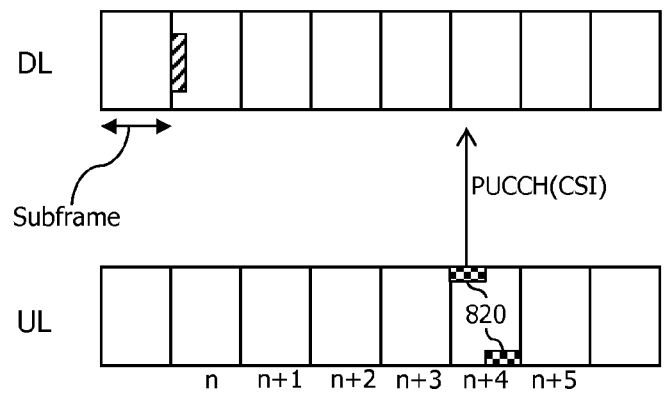
FIG. 7 illustrates an example of a periodic CSI report in 3GPP LTE.

FIG. 7 illustrates an example of a periodic CSI report in 3GPP LTE.

As shown in FIG. 7, the CSI may be transmitted through the PUCCH periodically according to a period determined in the upper layer. That is, the periodic channel state information (CSI) may be transmitted through the PUCCH.

The UE may be semi-statically configured by an upper layer signal so as to periodically feed-back a differential CSI (CQI, PMI, RI) through the PUCCH. In this case, the UE transmits the corresponding CSI according to modes defined as shown in a table given below.

TABLE 2

|  | PMI feed-back time | |
| --- | --- | --- |
|  | No PMI | Single PMI |
| PUCCH CQI feed-back type Wideband CQI | mode 1-0 | mode 2-0 |
| Selective subband CQI | mode 2-0 | mode 2-1 |

A periodic CSI reporting mode in the PUCCH described below is supported for each of the aforementioned transmission modes.

TABLE 3

| Transmission mode (transmission mode) | PUCCH CSI reporting modes |
| --- | --- |
| Transmission mode 1 | modes 1-0, 2-0 |
| Transmission mode 2 | modes 1-0, 2-0 |
| Transmission mode 3 | modes 1-0, 2-0 |
| Transmission mode 4 | modes 1-1, 2-1 |
| Transmission mode 5 | modes 1-1, 2-1 |
| Transmission mode 6 | modes 1-1, 2-1 |
| Transmission mode 7 | modes 1-0, 2-0 |
| Transmission mode 8 | When PMI/RI reporting is configured to UE in modes 1-1 and 2-1; When PMI/RI reporting is not configured to UE in modes 1-0 and 2-0 |
| transmission mode 9 | When PMI/RI reporting is configured to UE in modes 1-1 and 2-1 and the number of CSI-RS ports is larger than 1. When PMI/RI reporting is not configured to UE in modes 1-0 and 2-0 or the number of CSI-RS ports is 1 |

Meanwhile, a collision of the CSI report means a case in which a subframe configured to transmit a first CSI and a subframe configured to transmit a second CSI are the same as each other. When the collision of the CSI report occurs, the first CSI and the second CSI are simultaneously transmitted, or the transmission of a CSI having a low priority is discarded (alternatively, referred to as abandon or drop), and a CSI having a high priority may be transmitted, according to priorities of the first CSI and the second CSI.

The CSI report through the PUCCH may include various report types according to a transmission combination of the CQI, the PMI, and the RI, and a period and an offset value divided according to each report type (hereinafter, abbreviated as a type) are supported.

Type 1: Supports CQI feedback for a subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RI feedback.

Type 4: Transmits the wideband CQI.

Type 5: Supports RI and wideband PMI feedback.

Type 6: Supports RI and PTI feedback.

The aperiodic transmission of CSI is described below.

Figure 8:
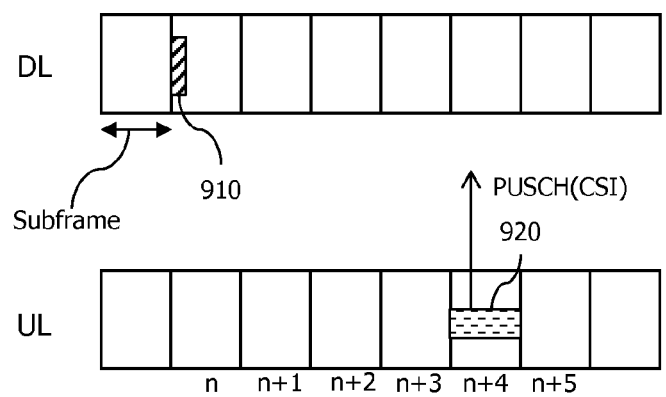
FIG. 8 illustrates an example of an aperiodic CSI report in 3GPP LTE.

FIG. 8 illustrates an example of an aperiodic CSI report in 3GPP LTE.

A control signal that requests the transmision of CSI, that is, an aperiodic CSI request signal, may be included in the scheduling control signal of a PUSCH transmitted in a PDCCH 910, that is, an UL grant. In this case, UE aperiodically reports CSI thruogh a PUSCH 920. As described above, the transmission of CSI on a PUSCH is called an aperiodic CSI report in that it is triggered in response to a request from a BS. The CSI report may be triggered by an UL grant or a random access response grant.

More specifically, a wireless device receives an UL grant, including information about the scheduling of the PUSCH, through the PDCCH 910 in a subframe n. The UL grant may include a CQI request field. The following table illustrates an example of a CQI request field of 2 bits. The value or number of bits of the CQI request field is only an example.

TABLE 4

| Value of CQI request field | Contents |
| --- | --- |
| 00 | A CSI report is not triggered |
| 01 | A CSI report on a serving cell is triggered |
| 10 | A CSI report on a first set of serving cells is triggered |
| 11 | A CSI report on a second set of serving cells is triggered |

A BS may previously notify a wireless device of information about the first and the second sets whose CSI reports are triggered.

When a CSI report is triggered, the wireless device transmits CSI on the PUSCH 920 in a subframe n+k. In this case, k=4, but is only an example.

A BS may previously designate report node for CSI to a wireless device.

The following table illustrates an example of CSI report modes in 3GPP LTE.

TABLE 5

|  | PMI feedback type | | |
| --- | --- | --- | --- |
|  | No PMI | Single PMI | Multiple PMI |
| Wideband CQI |  |  | Mode 1-2 |
| Selective subband CQI | Mode 2-0 |  | Mode 2-2 |
| Set subband CQI | Mode 3-0 | Mode 3-1 |  |

(1) Mode 1-2 (mode 1-2)

A precoding matrix is selected on the assumption that DL data is transmitted only through a corresponding subband with respect to each subband. A wireless device generates a CQI (called a wideband CQI) by assuming the selected precoding matrix with respect to a band (called a band set S) designated by a system band or a high layer signal.

The wireless device transmits CSI including the wideband CQI and the PMI of each subband. In this case, the size of each subband may be different depending on the size of a system band.

(2) Mode 2-0

A wireless device selects preferred M subbands with respect to a band (band set S) designated by a system band or a high layer signal. The wireless device generates a subband CQI by assuming that data has been transmitted in the selected M subbands. The wireless device additionally generates a single wideband CQI with respect to the system band or the band set S.

The wireless device transmits CSI, including information about the selected M subbands, the subband CQI, and the wideband CQI.

(3) Mode 2-2

A wireless device selects M preferred subbands and a single precoding matrix for the M preferred subbands on the assumption that DL data is transmitted throuhg the M preferred subbands.

Subband CSI for the M preferred subbands is defined in each codeword. In addition, the wireless device generates a wideband CQI for a system band or a band set S.

The wireless device transmits CSI, including the M preferred subbands, a single subband CQI, and a PMI, wideband PMI, and wideband CQI for the M preferred subbands.

(4) Mode 3-0

A wireless device transmits CSI, inclduing a wideband CQI and a subband CQI for configured subbands.

(5) Mode 3-1

A wireless device generates a single precoding matrix for a system band or a band set S. The wireless device generates a subband CQI for each codeword by assuming the generated single precoding matrix. The wireless device may generate a wideband CQI by assuming the single precoding matrix.

The simultaneous transmission of a PUCCH and a PUSCH is described below.

In 3GPP Release 8 or Release 9 systems, UE is not allowed to simultaneously transmit a PUCCH and a PUSCH on a signle carrier in order to maintain single carrier characteristics when using the SC-FDMA method for uplink transmision.

In 3GPP Release 10 systems, however, whether a PUCCH and a PUSCH are simultaneously transmitted may be indicated by a higher layer. That is, UE may simultaneously transmit a PUCCH and a PUSCH or may transmit only one of a PUCCH and a PUSCH in response to an instruction from a higher layer.

Figure 9:
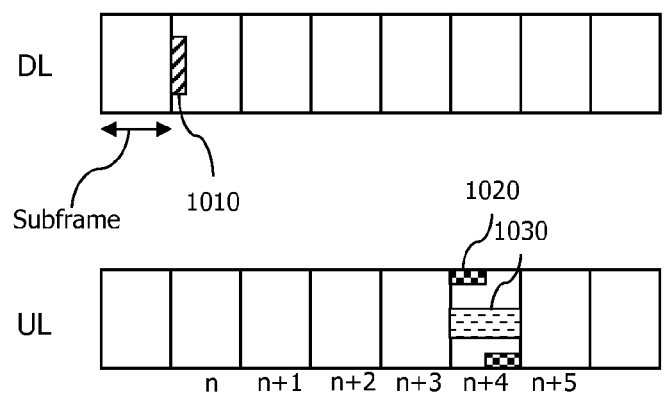
FIG. 9 illustrates an example of the simultaneous transmission of a PUCCH and a PUSCH.

FIG. 9 illustrates an example of the simultaneous transmission of a PUCCH and a PUSCH.

As may be seen with reference to FIG. 9, UE receives a PDCCH 1010 in a subframe n.

Furthermore, the UE may simultaneously transmit a PUCCH 1020 and a PUSCH 1030 in a subframe n+4, for example.

The simultaneous transmission of the PUCCH and the PUSCH is defined as folows in a 3GPP Release 10 system.

It is assumed that UE has been configured for only a single serving cell and configured to not simultaneously transmit a PUSCH and a PUCCH. In this case, if the UE does not transmit a PUSCH, UCI may be transmitted according to the PUCCH formats 1/1a/1b/3. If the UE transmits a PUSCH, but the PUSCH does not correspond to a random access response grant, UCI may be transmitted through the PUSCH.

Unlike in the above, it is assumed that UE has been configured for only a single serving cell and configured to not simultaneously transmit a PUSCH and a PUCCH. In this case, if UCI includes only HARQ-ACK and an SR, UCI may be transmitted through a PUCCH according to the PUCCH formats 1/1a/1b/3. If UCI includes only periodic CSI, however, the UCI may be transmitted on a PUCCH according to the PUCCH format 2. Alternatively, if UCI includes periodic CSI and HARQ-ACK and the UE does not transmit a PUSCH, the UCI may be transmitted throguh a PUCCH according to the PUCCH formats 2/2a/2b. Alternatively, if UCI includes only HARQ-ACK/NACK or UCI includes HARQ-ACK/NACK and an SR, UCI includes an affirmative SR and periodic/aperiodic CSI, or UCI includes only aperiodic CSI, the HARQ-ACK/NACK, the SR, and the affirmative SR may be transmitted through a PUCCH, and the periodic/aperiodic CSI may be transmitted through a PUSCH.

Unlike in the above, it is assumed that UE has been configured for one or more serving cells and configured to not simultaneously transmit a PUSCH and a PUCCH. In this case, if the UE does not transmit a PUSCH, UCI may be transmitted through a PUCCH according to the PUCCH formats 1/1a/1b/3. If UCI includes aperiodic CSI or includes aperiodic UCI and HARQ-ACK, the UCI may be transmitted through the PUSCH of a serving cell. Alternatively, if UCI includes periodic CSI and HARQ-ACK/NACK and the UE does not transmit a PUSCH in the subframe n of a primary cell, the UCI may be transmitted through the PUSCH.

Unlike in the above, it is assumed that UE has been configured for one or more serving cells and configured to be able to simultaneously transmit a PUSCH and a PUCCH. In this case, if UCI includes one or more of HARQ-ACK and an SR, the UCI may be transmitted through a PUCCH according to the PUCCH formats 1/1a/1b/3. If UCI includes only periodic CSI, however, the UCI may be transmitted through a PUCCH using the PUCCH format 2. Alternatively, if UCI includes periodic CSI and HARQ-ACK/NACK and the UE does not transmit a PUSCH, CSI may be dropped (or abandoned) without being transmitted according to some conditions. Alternatively, if UCI is transmitted through HARQ-ACK/NACK and periodic CSI and the UE transmits a PUSCH in the subframe of a primary cell, the HARQ-ACK/NACK may be transmitted through a PUCCH according to the PUCCH formats 1a/1b/3 and the periodic CSI may be transmitted through the PUSCH.

An HARQ in 3GPP LTE is described below.

3GPP LTE uses an synchronous HARQ in uplink transmission and uses an asynchronous HARQ in downlink transmission. The synchronous HARQ means that retransmission timing is fixed, and the asynchronous HARQ means that retransmission timing is not fixed. That is, the synchronous HARQ is initially transmitted and retransmitted in a cycle of an HARQ.

Figure 10:
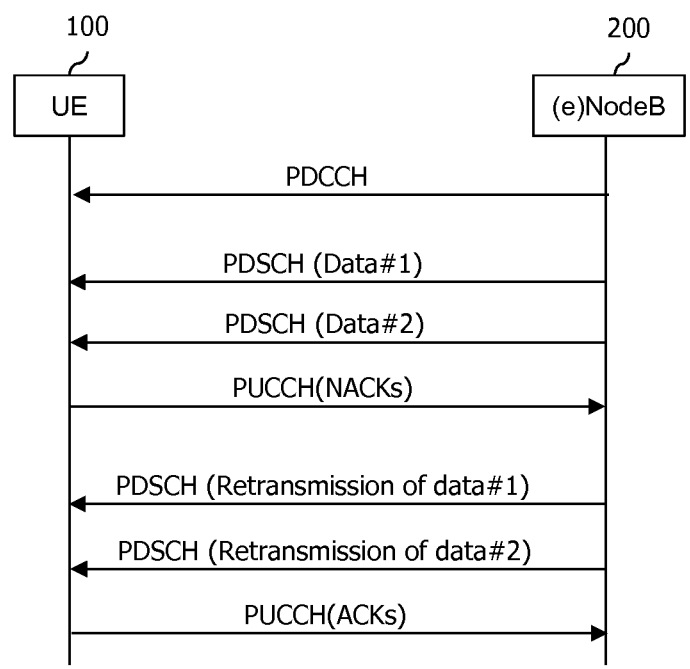
FIG. 10 is an exemplary diagram illustrating the operation of an HARQ between a BS and UE.

FIG. 10 is an exemplary diagram illustrating the operation of an HARQ between an (e)NodeB and UE.

As illustrated in FIG. 10, in a prior art, an HARQ operation is performed in the MAC layer for efficient transmission of data, and a detailed HARQ operation process is as follows.

First, an (e)NodeB, that is, an eNodeB 200, transmits scheduling information through a physical downlink control channel (PDCCH) in order to transmit data to UE, that is, UE 100, using an HARQ method.

The UE 100 checks incoming scheduling information by monitoring the control channel, that is, the PDCCH.

If information about the UE 100 is found to be present by checking the scheduling information, the UE 100 receives data (e.g., illustrated data#1 and data#2) from the eNodeB 200 through a common channel (a physical shared channel (PSCH)) at a point of time associated with the PDCCH.

When receiving the data, the UE 100 attempts the decoding of the data. The UE transmits HARQ feedback to the eNodeB 200 based on a result of the decoding. That is, the UE 100 transmits an ACK signal if it is successful in the decoding and transmits an NACK signal to the eNodeB 200 through a PUCCH or PUSCH if it is unsuccessful in the decoding.

When receiving the ACK signal, the eNodeB 200 detects that the transmission of the data to the UE has been successful and transmits next data.

If the eNodeB 200 receives the NACK signal, it detects that the transmission of the data to the UE 100 has been unsuccessful and retransmits the same data according to the same format or a new format at a proper point of time.

The UE 100 that has sent the NACK signal attempts the reception of the retransmitted data.

If the UE 100 receives the retransmitted data, it combines the retransmitted data and data stored in a buffer in the state in which the decoding of the data has been previously unsuccessful using various methods and attempts the decoding of the data. The UE 100 transmits an ACK signal if it is successful in the decoding and transmits an NACK signal to the eNodeB 200 through a PUCCH or PUSCH it is unsuccessful in the decoding. The UE 100 repeats a process of transmitting an NACK signal and receiving retransmitted data until it is successful in the decoding of data.

An HARQ in a downward direction, that is, in the direction from the eNodeB 200 to the UE 100, has been described so far.

However, an synchronous HARQ is used in an upward direction, that is, in the direction from the UE 100 to the eNodeB 200. In this case, the synchronous HARQ means that the time interval between the transmissions of data is the same. That is, if UE has to perform retransmission on any transmission after performing the transmission, the transmission is generated after a specific time from previous transmission. In this case, there are advantages in that the waste of radio resources occurring because scheduling information is transmitted using a PDCCH at each transmission point of time can be reduced and the danger of not performing proper transmission because UE does not properly receive a PDCCH can be reduced.

Figure 11:
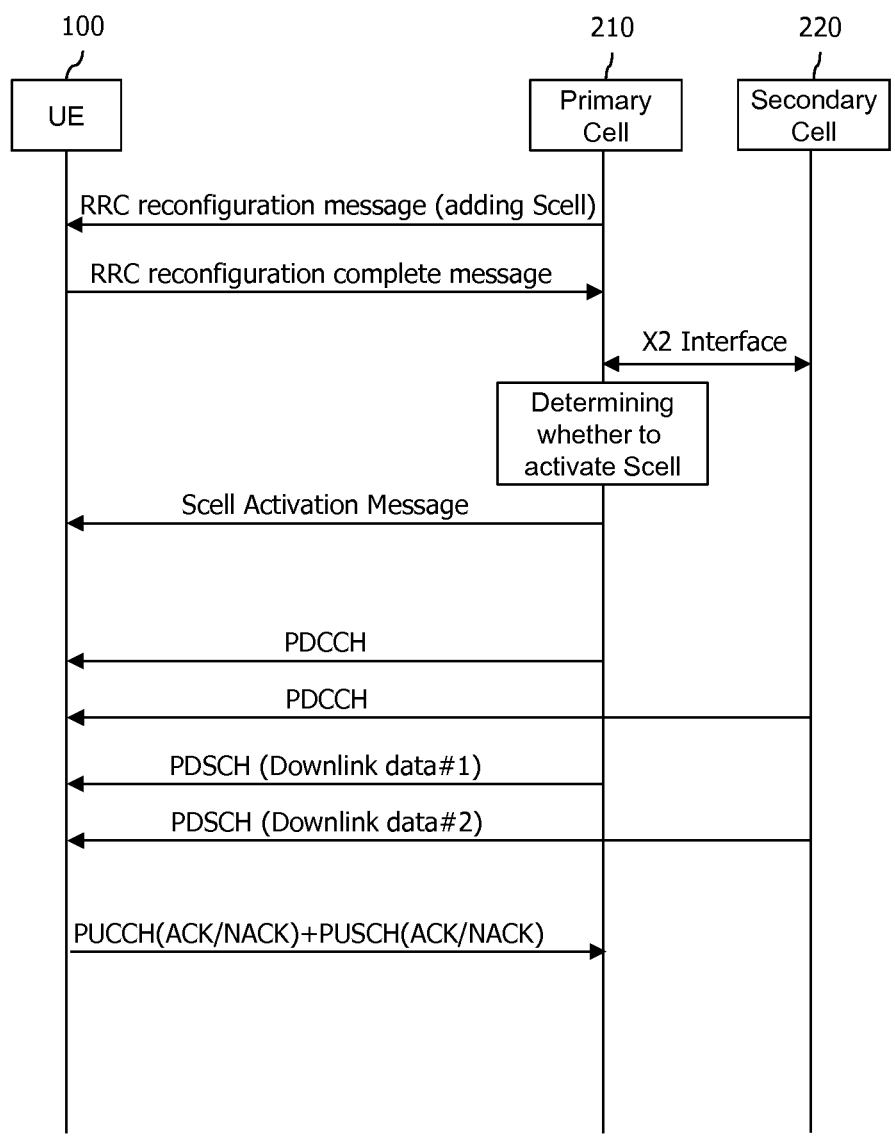
FIG. 11 is a flowchart illustrating a technical ambiguity that may occur when each cell performs scheduling in the state in which a primary cell has configured and activated a secondary cell.

FIG. 11 is a flowchart illustrating a technical ambiguity that may occur when each cell performs scheduling in the state in which a primary cell has configured and activated a secondary cell.

Referring to FIG. 11, a primary cell 210 transmits an RRC reconfiguration message to UE, that is, UE 100. A secondary cell, that is, a Scell, may be added by the RRC reconfiguration message. In this case, the secondary cell may be for downlink. That is, the primary cell provides both uplink and downlink, but the secondary cell may provide only downlink.

In this case, the two cells may be intra-eNodeB types or inter-eNodeB types.

The UE 100 transmits an RRC reconfiguration-complete message to the primary cell 210 in response to the RRC reconfiguration message.

The primary cell 210 determines whether or not to activate the added secondary cell 220, that is, the SCell. If the added secondary cell 220 needs to be activated, the primary cell 210 transmits an activation message to the UE 100.

Meanwhile, if the two cells are inter-eNodeBs, each cell may independently scheduling on its downlink. Accordingly, each cell transmits a PDCCH including scheduling information and then transmits a PDSCH, including downlink data, to the UE 100.

When receiving the downlink data, the UE 100 needs to transmit HARQ-ACK/NACK for the downlink data. In this case, since uplink is provided by only the primary cell 210, the UE 100 transmits both HARQ-ACK/NACK for downlink data#1, received from the primary cell, and HARQ-ACK/NACK for downlink data#1, received from the secondary cell, to the primary cell.

Meanwhile, an uplink channel in which UCI including the HARQ-ACK/NACK for the downlink data#1 received from the primary cell 210 is transmitted and an uplink channel in which UCI including the HARQ-ACK/NACK for the downlink data#2 received from the secondary cell 220 is transmitted may be different. For example, the uplink channel in which UCI including the HARQ-ACK/NACK for the downlink data#1 received from the primary cell 210 is transmitted may be a PUCCH, and the uplink channel in which UCI including the HARQ-ACK/NACK for the downlink data#2 received from the secondary cell 220 is transmitted may be a PUSCH.

In this case, a case where the UE 100 has not been configured to simultaneously transmit a PUCCH and a PUSCH is taken into consideration. Accordingly, there may be a problem in that the HARQ-ACK/NACK for the downlink data#1 that needs to be transmitted through a PUCCH and the HARQ-ACK/NACK for the downlink data#2 that needs to be transmitted through a PUSCH are unable to be simultaneously transmitted.

Pieces of UCI of cells may collide against each other because the cells independently perform scheduling as described above.

Accordingly, there is a need for a soultion for improving a collision between a PUCCH and a PUSCH for a plurality of cells from a viewpoint of a single piece of UE.

Solutions for improvement are described below.

First, in a first improvement solution, the UE 100 may be configured to simultaneously transmit a PUCCH and a PUSCH.

In a second improvement solution, information about downlink/uplink resources to be used by cells may be shared in advance or through a high layer signal in order to prevent a collision between a PUCCH and a PUSCH that may occur. In this case, since the downlink/uplink resource information may include a subframe and a resource bock (RB), a single cell may perform scheduling in an odd-numbered subframe index, and another cell may perform scheduling in an even-numbered subframe index. Alternatively, a scheme in which a specific cell notifies another cell of information about resources to be used for a specific interval through a high layer signal and another cell performs scheduling in such a way as to avoid a collision based on corresponding information may be taken into consideration. In this case, the specific cell may be a primary cell (i.e., a Pcell), and the specific interval may be a multiple type of a cycle that is required when pieces of information are exchanged between two eNodeBs. In this second improvement solution, UE may perform (E-)PDCCH monitoring on resources allocated to each cell.

In a third improvement solution, when a collision between a PUCCH and a PUSCH occurs, UE may solve the collision by selecting one of the PUCCH and the PUSCH. This is described below with reference to FIG. 12.

Figure 12:
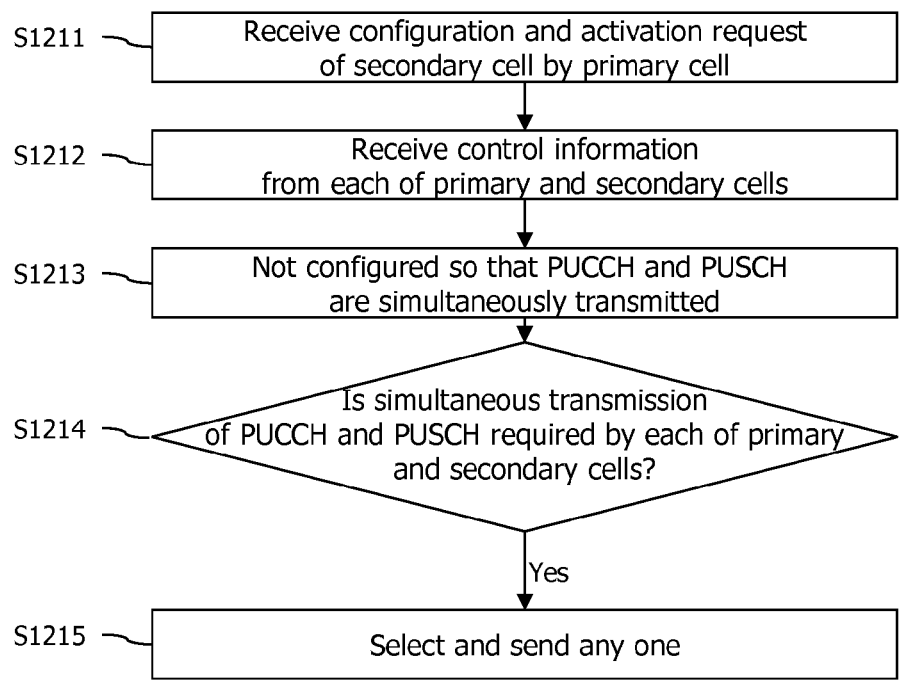
FIG. 12 is an exemplary diagram illustrating a procedure for selecting any one of a PUCCH and a PUSCH.

FIG. 12 is an exemplary diagram illustrating a procedure for selecting any one of a PUCCH and a PUSCH.

As may be seen with reference to FIG. 12, the configuration and activation request of a secondary cell 220 by a primary cell 210 is received (S1211). Furthermore, control information is received from each of the primary cell 210 and the secondary cell 220 (S1212). In accordance with the control information, a PUCCH and a PUSCH are not configured to be simultaneously transmitted (S1213).

However, since the primary cell 210 and the secondary cell 220 independently perform scheduling, the simultaneous transmission of a PUCCH and a PUSCH is required, and thus a collision occurs between the PUCCH and the PUSCH (S1214)

Accordingly, UE 10 selects and transmits any one of the PUCCH and the PUSCH (S1215), thereby being capable of avoiding the collision.

In this case, a cell in which the PUSCH is to be scheduled and to be received may be previously designated or may be configured through a high layer signal. In this case, an uplink grant for the PUSCH is transmitted through only a cell whsoe uplink scheduling has been permitted. In this case, the cell is called an uplink scheduling cell, for convenience sake.

If a PUSCH to be transmitted to an uplink scheduling cell and a PUCCH to be transmitted to another cell collide against each other in the same subframe in a condition in which the simultaneous transmission of the PUCCH and the PUSCH has not been configured, the collision can be solved by selecting one of containers. In this case, the seleciton may be achieved through priority. In this case, priority may be determined based on a cell, may be determined based on a container, or may be determined based on the type of the UCI of each cell. In addition, the number of bits of information of an UL-SCH may be taken into consideration. Alternatively, UE may determine rules for priority through a high layer signal. In the above examples, the scheme based on a cell may include giving higher priority to information (e.g., UCI or an UL-SCH) about a primary cell Pcell. This is described in more detail with reference to FIGS. 13A to 13E.

FIGS. 13A to 13E are exemplary diagrams illustrating FIG. 12 more specifically.

Figure 13A:
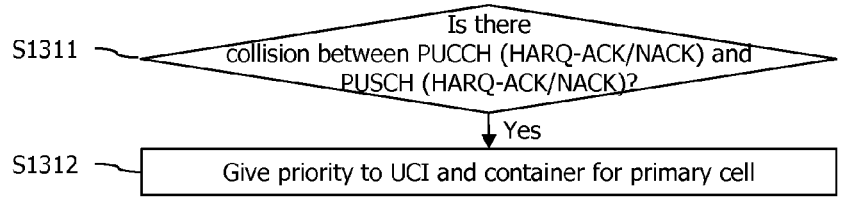
FIGs. 13A to 13E are exemplary diagrams illustrating FIG. 12 more specifically.

As may be seen with reference to FIG. 13A, UE 100 determines whether a condition in which a PUCCH including HARQ-ACK and a PUSCH including HARQ-ACK have to be simultaneously transmitted in a single subframe is generated although the simultaneous transmission of a PUCCH and a PUSCH has not been configured (S1311). In this case, the PUCCH including HARQ-ACK may include periodic CSI, an SR, etc. The PUSCH may further include one or more of periodic CSI, aperiodic CSI, and an UL-SCH. In this case, the PUCCH and the PUSCH are for different cells, and thus may include different cell IDs, power control, etc. so that different types of scrambling can be appleid to the PUCCH and the PUSCH. In this case, the ID of a primary cell and the ID of a secondary cell may be received through the primary cell. In particular, the ID of the primary cell may be obtained through an synchronous channel or a broadcast channel. Furthermore, the ID of the secondary cell may be obtained through a high layer signal, for example, through an RRC signal.

Accordingly, the UE 100 gives priority to UCI and a container for a primary cell (i.e., a Pcell) (S1312). That is, the UE 100 sets higher priority to the UCI and container for the primary cell (i.e., Pcell). In this case, the UE 100 drops (or abandons) information for a secondary cell (i.e., a Scell) on a corresponding subframe.

Alternatively, the step S1312 may be modified.

In a first modification example, the UE 100 transmits a PUCCH and may not transmit a PUSCH. In this case, UCI included in the PUSCH may be dropped (or abandoned) from a corresponding subframe.

In a second modification example, the UE 100 transmits a PUSCH and may not transmit a PUCCH. In this case, UCI included in the PUCCH may be dropped (or abandoned) from a corresponding subframe.

In a third modification example, the UE 100 transmits a PUCCH and may not transmit a PUSCH. In this case, part of or the entire UCI included in the PUSCH is simultaneously transmitted through the PUCCH. In this case, the UE 100 may additionally perform process for reducing some of or all the number of bits of the UCI included in the PUSCH. In this case, the PUCCH resources may be previously designated or may be configured through a high layer signal. If a PUCCH and a PUSCH collide against each other, the UE 100 may use the PUCCH resources.

In a fourth modification example, the UE 100 transmits a PUSCH and does not transmit a PUCCH. In this case, part of or the entire UCI included in the PUCCH may be transmitted through the PUSCH. The UE 100 may additionally perform a process for reducing the number of bits of part of or the entire UCI included in the PUSCH. The PUSCH resources may be previously designated or may be configured through a high layer. The UE may limitedly use the resources when a PUCCH and a PUSCH collide against each other.

In a fifth modification example, the UE 100 may include part of or the entire UCI in a container corresponding to a primary cell (i.e., a Pcell) and transmit the container. In a sixth modification example, the UE 100 selects a container to be transmitted through a high layer signal, includes part of or the entire UCI in the container, and transmits the container. In this case, the selected container may be limited and dedicated to a corresponding cell, and other cells other than the corresponding cell may perform DTX detection on a container corresponding to the corresponding cell.

Figure 13B:
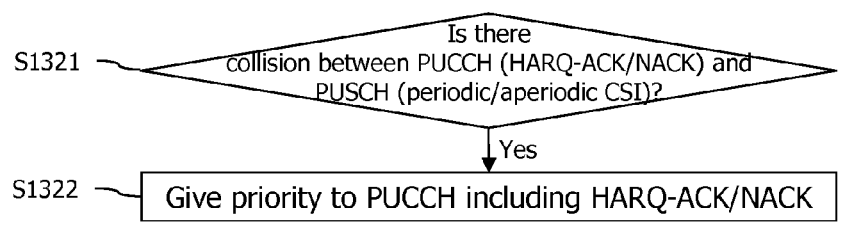

Meanwhile, as may be seen with reference to FIG. 13B, the UE 100 determines whether a condition in which a PUCCH including HARQ-ACK and a PUSCH including periodic/aperiodic CSI have to be simultaneously transmitted wihitn a single subframe is generated despite the fact that the simultaneous transmission of a PUCCH and a PUSCH has not been configured (S1321). In this case, the PUCCH including HARQ-ACK may further include periodic CSI, an SR, etc. Furthermore, the PUSCH may further include an UL-SCH. However, in FIG. 13B, it is assumed that HARQ-ACK information is not included in the PUSCH. In this case, the PUCCH and the PUSCH may include different cell IDs, power control, etc. so that different types of scrambling can be applied to the PUCCH and the PUSCH because the PUCCH and the PUSCH are for different cells.

Accordingly, the UE 100 gives priority to a PUCCH including HARQ-ACK/NACK (S1322). That is, the UE 100 gives higher priority to HARQ-ACK/NACK over CSI and an UL-SCH. Accordingly, the UE 100 transmits a PUCCH. In this case, a PUSCH is not transmitted, UCI included in the PUSCH is dropped (or abandoned) from a corresponding subframe. Alternatively, the UE 100 may include part of or the entire UCI of the PUSCH in the PUCCH.

Alternatively, the step S1322 may be modified.

In a first modification example, the UE 100 transmits a PUSCH. In this case, HARQ-ACK/NACK may be included in the PUSCH in such a way as to be piggybacked to the PUSCH, and information about the PUSCH may not be dropped (or abandoned) from a corresponding subframe. In this case, resources for the PUSCH may be previously designated or may be configured by a higher layer, and the UE 100 may use the resources for the PUSCH when a PUCCH and a PUSCH collide against each other.

In a second modification example, the UE 100 transmits the container of a primary cell (i.e., a Pcell). If the container of the primary cell (i.e., Pcell) is a PUCCH, the UE 100 performs the step S1322. If the container of the primary cell (i.e., Pcell) is a PUSCH, the UE 100 processes the PUSCH according to the first modification example.

In a third modification example, the UE 100 selects a container to be transmitted in response to a higher layer signal, includes part of or the entire UCI in the container, and transmits the container. The resources of the corresponding container may be previously designated or may be configured in response to a higher layer signal. The UE 100 may use the resources if a PUCCH and a PUSCH collide against each other.

In a fourth modification example, the UE 100 determines priority using information about the size of bits of an UL-SCH as a parameter. In this case, the information about the size of bits may be aware through a TBS index. For example, if the value of a TBS index is greater than a threshold that has been previously designated or designed by a higher layer, higher priority is given to a PUSCH including an UL-SCH over a PUCCH. In this case, HARQ-ACK may be dropped (or abandoned) from a corresponding subframe.

In a fifth modification example, the UE 100 may set higher priority to UCI and a container corresponding to a primary cell (i.e., a Pcell). The UE 100 may transmit a channel corresponding to the primary cell (i.e., Pcell) and drop (or abandon) information corresponding to a secondary cell (i.e., a Scell) from a corresponding subframe.

Figure 13C:
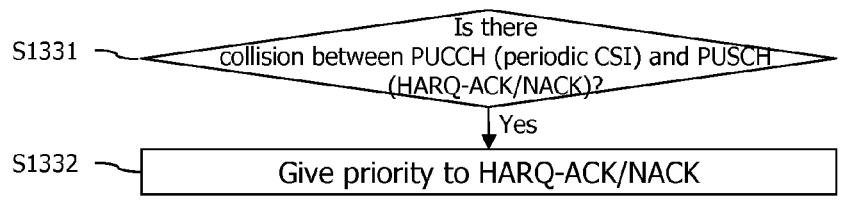

Furthermore, as may be seen with reference to FIG. 13C, the UE 100 determines whether a conditon in which a PUCCH including periodic CSI and a PUSCH including HARQ-ACK/NACK need to be simultaneously transmitted within a single subframe is generated despite the fact that the simultaneous transmission of a PUCCH and a PUSCH have not been configured (S1331). In this case, it is assumed that the PUCCH including periodic CSI does not include HARQ-ACK/NACK. The PUSCH may include another UCI and UL-SCH. In this case, the PUCCH and the PUSCH may include different cell IDs, power control, etc. so that different types of scrambling can be appleid to the PUCCH and the PUSCH because the PUCCH and the PUSCH are for different cells.

Accordingly, the UE 100 gives priority to the HARQ-ACK/NACK (S1332). That is, the UE 100 gives higher priority to the HARQ-ACK/NACK over the periodic CSI, and thus the UE transmits the PUSCH. In this case, the PUCCH is not transmitted, and UCI included in the PUCCH may be dropped (or abandoned) from a corresponding subframe.

Alternatively, the step S1332 may be modified.

In a first modification example, the UE 100 gives higher priority to HARQ-ACK over periodic CSI, and thus the UE transmits a PUCCH. In this case, a PUSCH is not transmitted, and part of or the entire UCI included in the PUSCH is simultaneously transmitted along with periodic CSI for the PUCCH through the PUCCH. The UCI included in the PUSCH may be HARQ-ACK. The PUCCH resources may be previously designated or may be configured in response to a high layer signal. The UE 100 may use the resources when a PUCCH and a PUSCH collide against each other.

In a second modification example, the UE 100 transmits a PUSCH, and the PUSCH may include part of or the entire UCI included in a PUCCH. The PUCCH resources may be previously designated or may be configured through a high layer signal. The UE 100 may use the resources when a PUCCH and a PUSCH collide against each othe.

In a third modification example, the UE 100 gives higher priority to UCI and a container corresponding to a Pcell. The UE 100 transmits a channel corresponding to the Pcell. In this case, information corresponding to a SCell may be dropped (or abandoned) from a corresponding subframe.

Figure 13D:
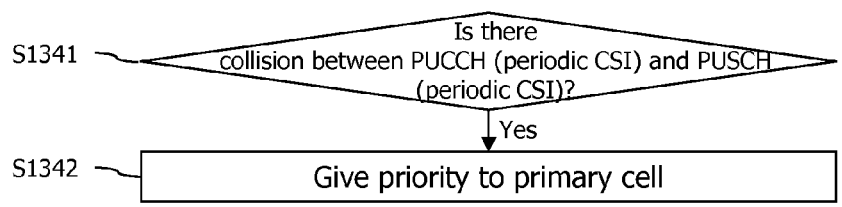

Furthermore, as may be seen with reference to FIG. 13D, the UE 100 determines whether a conditon in which a PUCCH including periodic CSI and a PUSCH including periodic CSI need to be simultaneously transmitted within a single subframe is generated despite the fact that the simultaneous transmission of a PUCCH and a PUSCH have not been configured (S1341). The PUSCH may further include an UL-SCH. However, it is assumed that the PUCCH and the PUSCH do not include HARQ-ACK/NACK. In this case, the PUCCH and the PUSCH may include different cell IDs, power control, etc. so that different types of scrambling can be appleid to the PUCCH and the PUSCH because the PUCCH and the PUSCH are for different cells.

Accordingly, the UE 100 gives priority to a primary cell (i.e., a Pcell) (S1342). That is, the UE 100 sets higher priority to UCI and a container corresponding to the primary cell (i.e., Pcell), and thus the UE 100 transmits a channel corresponding to the primary cell (i.e., Pcell). In this case, information corresponding to a secondary cell (i.e., a Scell) is dropped (or abandoned) from a corresponding subframe.

Alternatively, the step S1342 may be modified.

In a first modification example, the UE 100 transmits a PUCCH and may not transmit a PUSCH. In this case, UCI included in the PUSCH may be dropped (or abandoned) from a corresponding subframe.

In a second modification example, the UE 100 transmits a PUSCH and does not transmit a PUCCH. In this case, UCI included in the PUCCH may be dropped (or abandoned) from a corresponding subframe.

In a third modification example, the UE 100 transmits a PUCCH and does not transmit a PUSCH. Part of or the entire UCI included in the PUSCH is simultaneously transmitted through the PUCCH. The UE 100 may additionally perform a process for reducing the number of bits of part of or the entire UCI included in the PUSCH. The PUCCH resource may be previously designated or may be configured through a high layer signal. The UE 100 may limitedly use the resources when a PUCCH and a PUSCH collide against each other.

In a fourth modification example, the UE 100 transmits a PUSCH and does not transmit a PUCCH. In this case, part of or the entire UCI included in the PUCCH is simultaneously transmitted through the PUSCH. In this case, the UE 100 may additionally perform a process for reducing the number of bits of part of or the entire UCI included in the PUSCH. The PUCCH resources may be previously designated or may be configured through a high layer signal. The UE 100 may use the resources when a PUCCH and a PUSCH collide against each other.

In a fifth modification example, the UE 100 includes part of or the entire UCI in a container corresponding to a primary cell Pcell and transmits the container.

In a fifth modification example, the UE 100 selects a container to be transmitted in response to a higher layer signal, includes part of or the entire UCI in the container, and transmits the container.

Figure 13E:
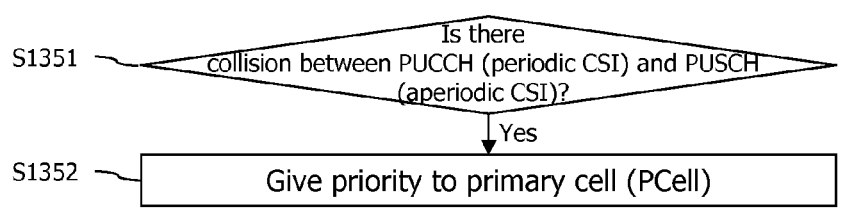

Furthermore, as may be seen with reference to FIG. 13E, the UE 100 determines whether a conditon in which a PUCCH including periodic CSI and a PUSCH including aperiodic CSI need to be simultaneously transmitted within a single subframe is generated despite the fact that the simultaneous transmission of a PUCCH and a PUSCH have not been configured (S1351). In this case, it is assumed that the PUCCH does not include HARQ-ACK. Furthermore, it is assumed that the PUSCH does not include HARQ-ACK information and necessarily includes aperiodic CSI. In this case, the PUCCH and the PUSCH may include different cell IDs, power control, etc. so that different types of scrambling can be appleid to the PUCCH and the PUSCH because the PUCCH and the PUSCH are for different cells.

Accordingly, the UE 100 gives priority to a primary cell (i.e., a Pcell) (S1352). That is, the UE 100 gives higher priority to UCI and a container corresponding to the primary cell (i.e., Pcell), and thus the UE 100 transmits a channel corresponding to the primary cell (i.e., Pcell). In this case, information corresponding to a secondary cell Scel may be dropped (or abandoned) from a corresponding subframe.

Alternatively, the step S1352 may be modified.

In a first modification example, the UE 100 gives higher priority to aperiodic CSI over periodic CSI, and thus the UE 100 transmits a PUSCH. In this case, a PUCCH is not transmitted, and the UCI of the PUCCH may be dropped (or abandoned) from a corresponding subframe.

In a second modification example, the UE 100 gives higher priority to aperiodic CSI over periodic CSI, and thus the UE 100 transmits a PUSCH. In this case, a PUCCH is not transmitted, part of or the entire UCI of the PUCCH is transmitted through the PUSCH. The PUSCH resources may be previously designated may be configured in response to a high layer signal. The UE 100 may use the resources when a PUCCH and a PUSCH collide against each other.

In the contents of the above description, information that is dropped (or abandoned) from a corresponding subframe may not be transmitted until a next schedule is present or may be retransmitted after a specific OFDM or a specific SC-FDMA symbol index.

An example in which the UE 100 sends UCI using the PUCCH format 3 is described below. More specifically, from among the embodiments, an example in which the UE 100 uses the PUCCH format 3 in order to transmit HARQ-ACK/NACK to be transmitted through a PUSCH through a PUCCH is described.

Figure 14:
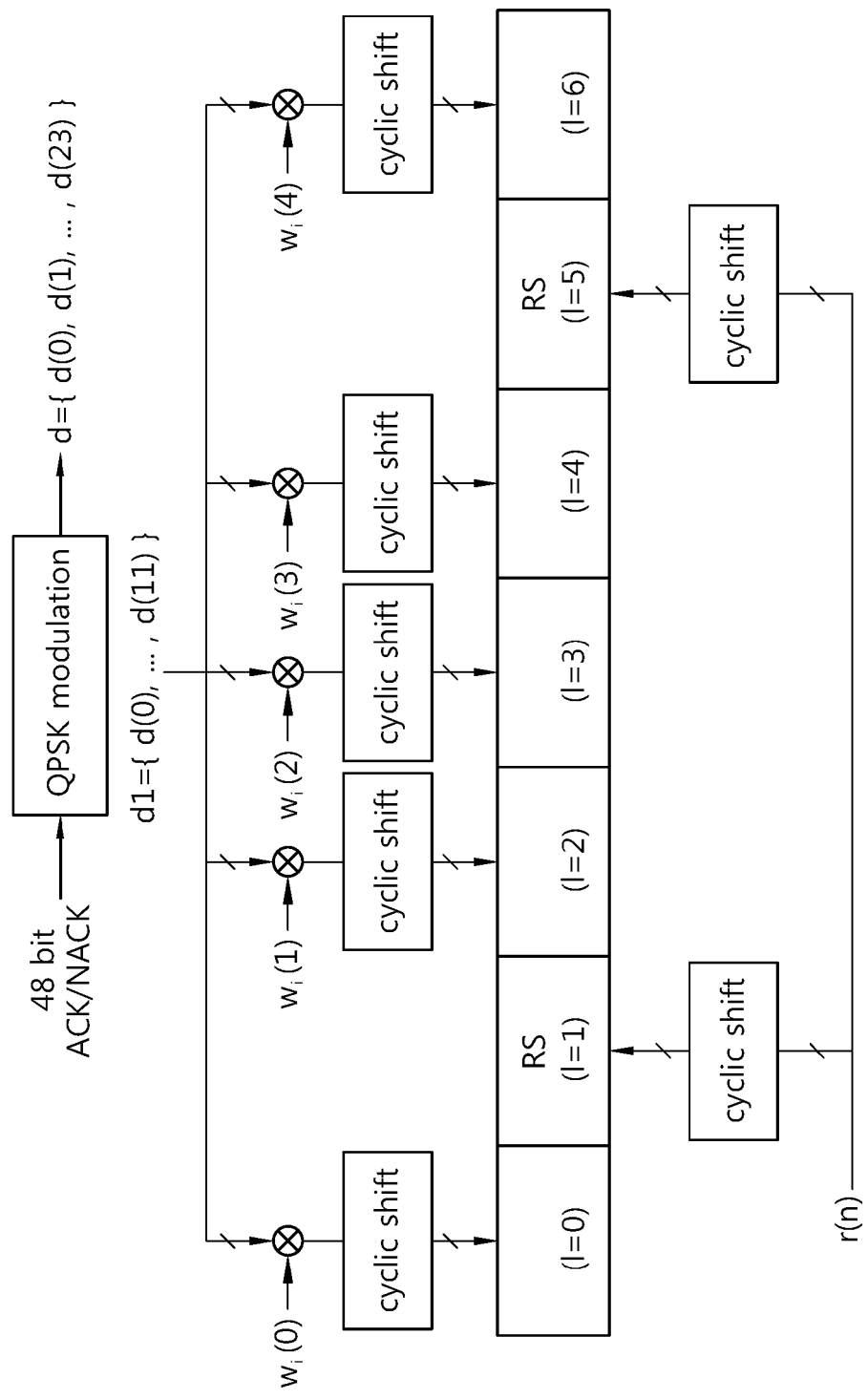
FIG. 14 is an exemplary diagram illustrating the structure of a PUCCH format 3 in a normal CP.

FIG. 14 is an exemplary diagram illustrating the structure of the PUCCH format 3 in a normal CP.

As the plurality of serving cells are used, the PUCCH format 3 is additionally introduced in addition to the PUCCH format of the existing 3GPP LTE, against deficiency in the number of bits required to transmit the UCI.

One slot includes 7 OFDM symbols and 1 has values of 0 to 6 as OFDM symbol numbers in the slot. Two OFDM symbols in which l=1 and 5 becomes RS OFDM symbols for a reference signal and residual OFDM symbols become data OFDM symbols for a the UCI signal.

48-encoded UCI (e.g., encoded ACK/NACK) is subject to quadrature phase-shift keying (QPSK) modulation to generate a symbol sequence d={d(0), d(1), . . . , d(23)}. d(n)(n=0, 1, . . . , 23) is a complex-valued modulated symbol. The symbol sequence d may be an aggregation of modulated symbols. The number of bits or a modulation scheme of the UCI is just an example and the present invention is not limited thereto.

One PUCCH uses 1 RB and one subframe includes a first slot and a second slot. The symbol sequence d={d(0), d(1), . . . , d(23)} is divided into two sequences d1={d(0), . . . , d(11)} and d2={d(12), . . . , d(23)} which have a length of 12, and the first sequence d1 is transmitted in the first slot and the second sequence d2 is transmitted in the second slot. FIG. 4 illustrates that the first sequence d1 is transmitted in the first slot.

The symbol sequence is diffused to an orthogonal sequence wi. The symbol sequence corresponds to each data OFDM symbol and the orthogonal sequence is used to distinguish the PUCCH (alternatively, the UE) by diffusing the symbol sequence throughout the data OFDM symbols.

The orthogonal sequence has a diffusion coefficient of K=5 and includes 5 elements. As the orthogonal sequence, one of 5 orthogonal sequences of the following table may be selected according to an orthogonal sequence index i.

TABLE 6

| Index (i) | [$w_i(0)$, $w_i(1)$, $w_i(2)$, $w_i(3)$, $w_i(4)$] |
| --- | --- |
| 0 | [+1, +1, +1, +1, +1] |
| 1 | [+1, $e^{j2\pi/5}$, $e^{j4\pi/5}$, $e^{j6\pi/5}$, $e^{j8\pi/5}$] |
| 2 | [+1, $e^{j4\pi/5}$, $e^{j8\pi/5}$, $e^{j2\pi/5}$, $e^{j6\pi/5}$] |
| 3 | [+1, $e^{j6\pi/5}$, $e^{j2\pi/5}$, $e^{j8\pi/5}$, $e^{j4\pi/5}$] |
| 4 | [+1, $e^{j8\pi/5}$, $e^{j6\pi/5}$, $e^{j4\pi/5}$, $e^{j2\pi/5}$] |

Two slots in the subframe may use different orthogonal sequence indexes.

A reference signal sequence used for demodulating the UCI is mapped and transmitted to two RS OFDM symbol.

Channel coding for PUCCH format 3 will be described below.

UCI (e.g., CSI) u0, u1, uA−1 (A represents the number of bits of the UCI) is channel-coded, and as a result, the encoded bit sequence q0, q1, qB−1 is generated. B represents the number of bits which may be transmitted by the corresponding PUCCH and since PUCCH format 3 may transmit 48-bit coded the UCI, B=48.

PUCCH format 3 may transmit a maximum of 48 bits, but the channel coding uses a basis sequence for a (32, A) block code of Table 1. Accordingly, the channel coding is as follows by considering whether the number of the UCI bits, A is larger than number of RM bases (alternatively, also referred to as the basis sequence). The number of RM bases is 11.

If A<=11, it is as follows.

An intermediate sequence for the channel coding, $b_0$, $b_1$, . . . , $b_{31}$ is generated as follows.

$$b_i = \sum_{n=0}^{A-1}(u_n \cdot M_{i,n}) \bmod 2 \qquad \text{Equation 1}$$

Where, i=0, 1, . . . , 31 and $M_{i,n}$ represents a basis sequence for (32, 0) for Table 1.

A control information bit sequence $q_0$, $q_1$, . . . , $q_{B-1}$ is generated by cyclically repeating the intermediate sequence $b_0$, $b_1$, . . . , $b_{31}$ as follows.

$$q_i = b_{(i \bmod 32)} \qquad \text{Equation 2}$$

Where, i=0, 1, . . . , B−1.

If 11<A<=21, it is as follows.

Two intermediate sequence $b^1_i$, $b^2_i$ is generated as follows.

$$b^1_i = \sum_{n=0}^{\lceil A/2 \rceil - 1}(u_n \cdot M_{i,n}) \bmod 2, \qquad \text{Equation 3}$$

$$b^2_i = \sum_{n=0}^{A - \lceil A/2 \rceil - 1}(u_{\lceil A/2 \rceil + n} \cdot M_{i,n}) \bmod 2$$

Where, i=0, 1, . . . , 23.

The control information bit sequence q0, q1, . . . , qB−1 is generated by concatenating the intermediate sequences as follows.

$$q_i = b^1_j, \ q_{i+1} = b^1_{j+1}, \ q_{i+2} = b^2_j, \ q_{i+4} = b^2_{j+1} \qquad \text{Equation 4}$$

When A<=1 11, since one RM block code (alternatively, one RM encoder) is used, this is referred to as single RM. When A>11, since two RM block codes (alternatively, two RM encoders) are used, this is referred to as dual RM.

Transmission by the dual RM coding will be described below with reference to FIG. 15.

Figure 15:
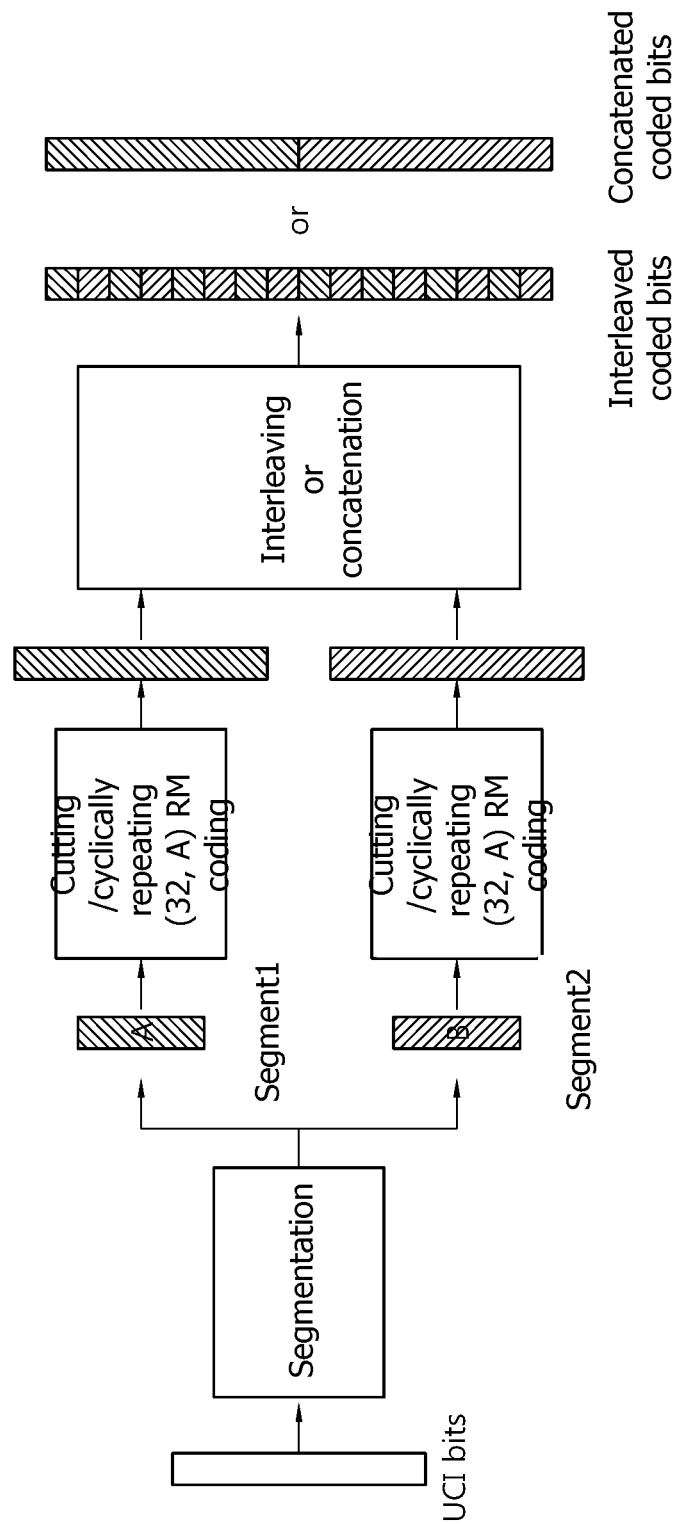
FIG. 15 illustrates a dual RM coding process.

FIG. 15 illustrates a dual RM coding process.

Referring to FIG. 15, when a the UCI bit stream (information bits) is more than 11 bits, a bit stream (referred to as a segment) segmented through segmentation is generated. In this case, each of segment 1 and segment 2 becomes 11 bits or less. The segments 1 and 2 are interleaved or concatenated through the (32, A) RM code. Thereafter, the UCI bit stream is truncated or circularly repeated in order to match the coded number of bits of the PUCCH format 3.

Figure 16:
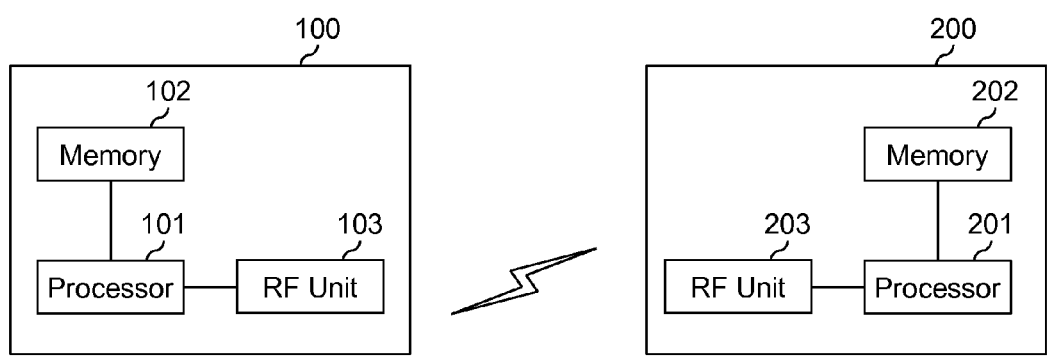
FIG. 16 is a block diagram illustrating a wireless communication system in which an embodiment of the present invention is implemented.

The exemplary embodiments of the present invention which has been described up to now may be implemented through various means. For example, the exemplary embodiments of the present invention may be implemented by hardware, firmware, software, or combinations thereof FIG. 16 is a block diagram illustrating a wireless communication system in which an embodiment of the present invention is implemented.

The base station 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

What is claimed is:

1. A method of transmitting, by a User Equipment (UE), Uplink Control Information (UCI) in a wireless communication system, the method comprising:

receiving, by the UE, control information that configures an uplink control channel and an uplink shared channel to avoid being simultaneously transmitted on a single uplink subframe;

determining, by the UE, whether a collision between the uplink control channel and the uplink shared channel is to occur, if first UCI for a first cell and second UCI for a second cell are required to be simultaneously transmitted through the uplink control channel and the uplink shared channel, respectively, on a single uplink subframe;

if the UE determines that the collision is to occur, selecting, by the UE, any one of the uplink control channel and the uplink shared channel; and transmitting, by the UE, one or more pieces of the first UCI and the second UCI on the uplink subframe through the selected channel, wherein the UE piggybacks a hybrid automatic repeat request (HARQ) acknowledgement (ACK)/negative ACK (NACK) to another channel other than the selected channel and transmits the HARQ ACK/NACK if each of the one or more pieces of the first UCI and the second UCI comprises the HARQ ACK/NACK.

2. The method of claim 1, wherein the selecting further comprises selecting any one channel based on at least one of the first cell, the second cell, a type of UCI, and a container.

3. The method of claim 2, wherein a priority is determined based on any one of the first cell, the second cell, the type of UCI, and the container.

4. The method of claim 1, further comprising steps of:
   receiving scheduling information from each of the first cell and the second cell on a downlink control channel; and
   receiving downlink data from each of the first cell and the second cell based on the received scheduling information,
   wherein each of the pieces of the first UCI and the second UCI comprises the HARQ ACK/NACK for each of the downlink data.

5. The method of claim 1, wherein a process for reducing a number of bits of the UCI to be transmitted through the selected channel is performed.

6. The method of claim 1, wherein UCI to be transmitted through the other channel other than the selected channel from the uplink subframe.

7. The method of claim 1, wherein:
   an IDentifier (ID) of the first cell is used for the transmission of the uplink control channel if the first UCI is transmitted to the first cell through the uplink control channel, and
   an ID of the second cell is used for the transmission of the uplink shared channel if the second UCI is transmitted to the second cell through the uplink shared channel.

8. The method of claim 7, wherein the ID of the first cell and the ID of the second cell are obtained through the first cell.

9. The method of claim 1, wherein:
   the uplink control channel to be transmitted to the first cell is scrambled using an IDentifier (ID) of the first cell, and
   the uplink shared channel to be transmitted to the second cell is scrambled using an ID of the second cell.

10. The method of claim 1, wherein the first cell and the second cell belong to independent base stations.

11. A user equipment for transmitting Uplink Control Information (UCI) in a wireless communication system, the user equipment comprising:

a transceiver configured to receive control information that configures an uplink control channel and an uplink shared channel to avoid being simultaneously transmitted on a single uplink subframe; and a processor operably coupled with the transceiver, wherein the processor is configured to determine whether a collision between the uplink control channel and the uplink shared channel is to occur, if first UCI for a first cell and second UCI for a second cell are required to be simultaneously transmitted through the uplink control channel and the uplink shared channel, respectively, on the single uplink subframe, wherein, if the processor determines that the collision is to occur, the processor is further configured to select any one of the uplink control channel and the uplink shared channel, wherein the transceiver is further configured to transmit one or more pieces of the first UCI and the second UCI on the uplink subframe through the channel selected by the processor, and wherein the transceiver is further configured to piggyback a hybrid automatic repeat request (HARQ) acknowledgement (ACK)/negative ACK (NACK) to another channel other than the selected channel and transmit the HARO ACK/NACK if each of the one or more pieces of the first UCI and the second UCI comprises the HARO ACK/NACK.

12. The user equipment of claim 11, wherein the processor performs a process for reducing a number of bits of the UCI to be transmitted through the selected channel.

13. The user equipment of claim 11, wherein the processor drops UCI to be transmitted through the other channel other than the selected channel from the uplink subframe.

* * * * *